United States Patent [19]
Holt et al.

[11] Patent Number: 5,306,183
[45] Date of Patent: Apr. 26, 1994

[54] PROPULSION SYSTEMS FOR SUBMARINE VESSELS

[75] Inventors: John K. Holt; Gregory C. Kennedy, both of Ft. Pierce, Fla.

[73] Assignee: Harbor Branch Oceanographic Institute Inc., Ft. Pierce, Fla.

[21] Appl. No.: 22,304

[22] Filed: Feb. 25, 1993

[51] Int. Cl.$^5$ .............................................. B60L 11/02
[52] U.S. Cl. ......................................... 440/6; 310/114
[58] Field of Search ................. 440/6; 310/87, 89, 90, 310/156, 114

[56] References Cited

U.S. PATENT DOCUMENTS

| | | | |
|---|---|---|---|
| 3,143,972 | 8/1964 | Smith et al. | 440/6 |
| 3,914,629 | 10/1975 | Gardiner | 440/6 |
| 5,185,545 | 2/1993 | Veronesi et al. | 440/6 |

Primary Examiner—Jesus D. Sotelo
Attorney, Agent, or Firm—Carroll F. Palmer

[57] ABSTRACT

A propulsion system for a submarine vessel includes a thruster including a magnetic flux generating stator, a shaftless propellant rotor, electrical conductors to supply electrical current to the thruster, an electronic controller to regulate such electrical current and a mounting unit to attach the thruster to the vessel. The stator includes a plurality of magnetizable pole pieces each associated with windings of conductive wires electrically connected to a power supply via the controller. The rotor includes a propeller ring containing a plurality of permanent magnets to be torqued by the magnetic flux from the stator pole pieces and a plurality of propeller blades. The rotation of the rotor (armature) provides position signals to the controller which then energizes the proper field windings of the stator to continue the motion and provide full torque regardless of rotor speed.

9 Claims, 3 Drawing Sheets

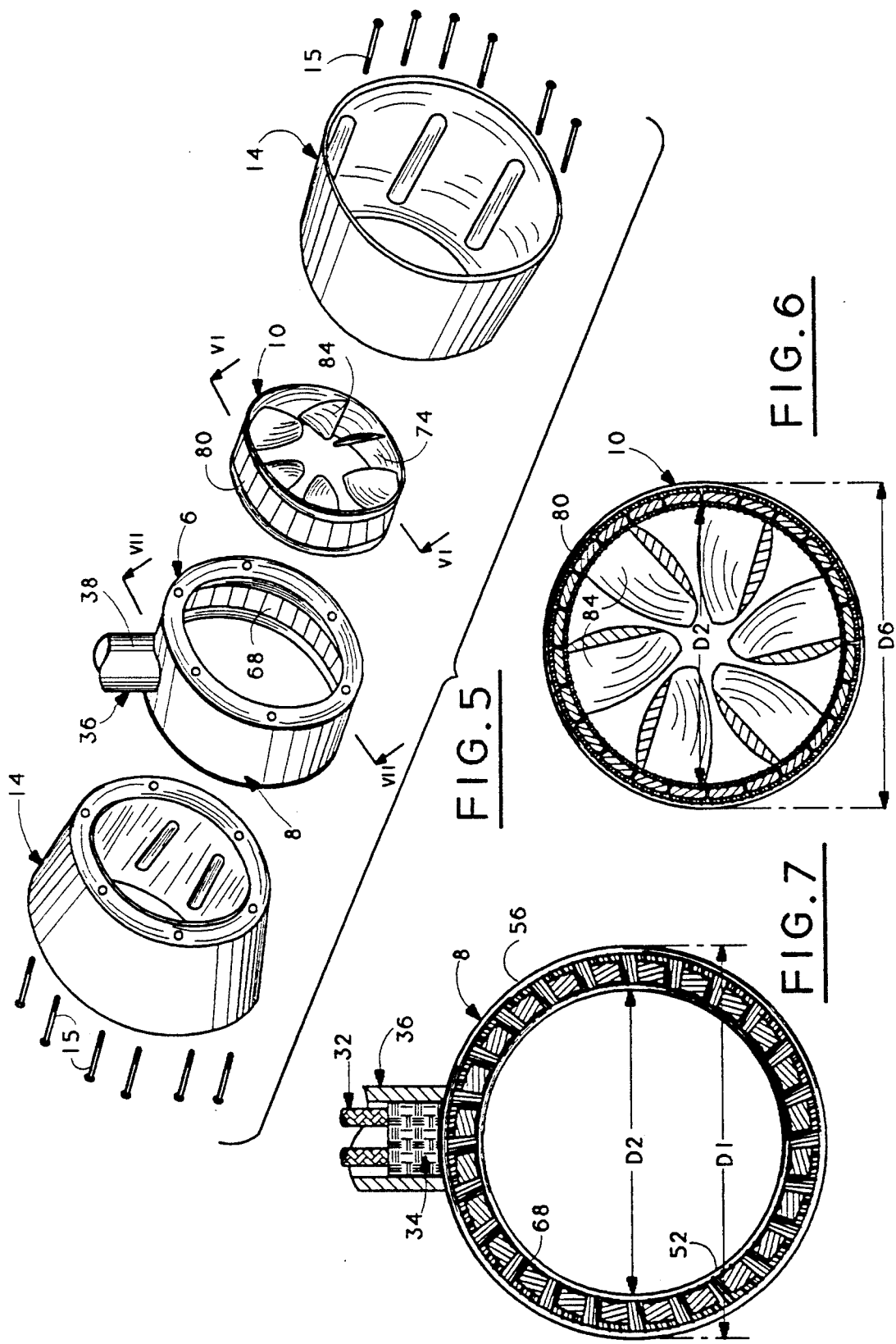

PROPULSION SYSTEMS FOR SUBMARINE VESSELS

BACKGROUND OF THE INVENTION

1. Field of the Invention

This application relates to new propulsion systems for submarine vessels and submarine vessels comprising such systems. More particularly, it concerns a new form of shaftless thrusters for submarine propulsion and submarine vessels equipped with such thrusters.

2. Description of the Prior Art

Submarine searches, research, investigations and like operations are accomplished with the use of special design submarine vessels. Typically such vessels are of two different types, i.e., personnel operated submarines and remotely operated vehicles (ROVs). Regardless of the type, there is a continuing need to reduce their power consumption and maintenance requirements while increasing their efficiency of operation. The present invention provides improved propulsion systems that help meet these demands.

Most modern underwater propulsion systems or thrusters, house a conventional electric motor in a pressure proof housing with gear reductions and special high pressure shaft seals, or no gear reduction, special seals and special high speed propellers. Both types utilize nozzles around the propellers to improve efficiency by reducing blade tip vortex for converting the centrifugal component of propeller induced water flow to axial thrust.

A naked, shaft driven propeller wastes a considerable amount of power, especially at low forward speed, through centrifugal eddy currents around the tips of the blades. The well known Kort nozzle limits the waste by limiting the eddy currents at the tips.

A "ring propeller" is one in which the nozzle is permanently attached to the propeller blade tips, and turns with it. At slow speeds, thrust is improved for a given power input. In contrast, the nozzle may remain fixed relative to its vessel while the propeller rotates within it to benefit from the nozzle's liquid flow control while propelling the vessel.

The most efficient portion of a propeller is the outer area of the blades. The hub of a central shaft driven propeller does little except hold the blades in position and transmit the torque to rotate them. Since the blades do the work, the hub and shaft must be substantial to provide the torque which the blades then translate into thrust. These factors concerning marine propellers are well known so a type of propeller has been designed that eliminates a central drive shaft as disclosed in U.S. Pat. No. 3,487,805. The present invention provides further improvements in this type of marine propeller.

Another serious reason for elimination of drive shafts and all other thru-hull shafts in manned and unmanned submersibles is to improve the integrity of the hull and motor housings. Thus, particularly with the motor housings, flooding occurs with undesired frequency due to the presence of thru-hull shafts and the stress imposed on thru-hull seals. Pressure in deep water submersibles increases with depth at about ½ psi per foot of depth. Thus, a submersible designed for operation at depths of 3000 ft must have seals on a thru-hull shaft capable of withstanding external pressures of about 1500 psi. The present invention addresses this hull integrity problem in the use of deep water submersibles and eliminates it by provision of new thrusters that require no thru-hull shafts and seals.

OBJECTS

A principal object of the invention is the provision of new propulsion systems for submarine vessels and submarine vessels powered with such systems.

Further objects include the provision of:

1. Such propulsion systems that provide the same thrust with substantially less power consumption, weigh much less and require less maintenance than prior know propulsion systems for submarine vessels.

2. New thrusters for submersible vehicles that will result in cost reductions, lower maintenance and improve efficiency of operation as compared with prior known thrusters.

3. Such thrusters that improve maneuverability and safety of deep water submersibles.

4. New deep water, submarine thrusters that are shaftless, require no through hull seals and have no reduction gears.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of new propulsion systems for submarine vessels that comprise a ring propeller that has permanent magnets affixed to its peripheral ring (rotor) which rotates within a stator arrangement of magnetic flux generating pole pieces. A motor controller breaks dc power fed to electrical conductive windings of the pole pieces into pulses causing a rotating magnetic field in the stator. The permanent magnets on the rotor essentially lock onto that rotating field, causing the rotor to turn. Speed and direction of rotation are managed by electronics in the controller section responding to signals from the submarine pilot. Control of motor direction and speed is accomplished via a bi-directional two wire current loop. The control loop drives a pair of opto-isolators providing electrical isolation from the motor drive circuitry. By reversing the direction of current flow in the control loop, motor direction can be controlled. Then by pulse-width modulating this control loop current, motor speed can be controlled.

Current sensing is accomplished by means of a solid-state toroidal hall effect current sensor. One of the motors main power conductors passes through the current sensor such that it is subject to the total motor current. Current sensing is performed on a cycle by cycle basis such that if current exceeds the set point at any time during an individual drive cycle, power is removed until that cycle time is complete.

The thrusters of the new propulsion systems are essentially brushless permanent magnet dc motors with a large diameter hollow rotor that rotates within a nozzle similar to a Kort nozzle in a conventional central shaft driven submarine thruster.

The thruster and associated nozzle is fixed to the submarine vessel by mounting means that advantageously houses the power supply conductors and control electronics, so that the electrical connections to the thruster will typically consist of two main power lead lines from electric battery pods and a control line (2 wires) from the submersible.

Bearing races are machined in both sides of the propeller ring (rotor). Matching races are machined in side plates forming components of a stator. Plastic balls and spacers ride in the races, forming thrust bearings to transfer the thrust from the propeller blades within the rotor through the side plates to the stator mount and thence to the submersible. In some embodiments, a second mount is provided to compensate for bending moment that may be present in a single mount. The load on the bearings when the ring is moving is almost entirely axial and, at rest, the only radial load is the small weight of the aluminum propeller and ring. The permanent magnets tend to center the entire rotor.

The motor ring (stator) contains the wound pole pieces and provides a mounting place to position and fasten side plates. This stator is advantageously potted in solid epoxy plastic, thereby rendering it waterproof and pressure proof. The connection chamber is poured full of epoxy after the wires of the stator are soldered to plugs mounted under a power can. Cast foam streamlining rings may be fastened to the mounting section of the stator to assist shaping the flow direction action of the Kort nozzle.

Basically, the thrusters of the new propulsion systems are shaftless ring propellers driven by torque applied to their periphery, where the power is actually used. Water lubricated ball thrust bearings are also at the periphery, resulting in a design in which a propeller hub and drive shaft are unnecessary.

Control of direction and speed of the submarine vessel equipped with the new propulsion systems is achieved by controlling the direction of current flow and pulse width to the thrusters. Moveable mount arrangements for the new thrusters can achieve additional directional control.

BRIEF DESCRIPTION OF THE DRAWINGS

A more complete understanding of the invention can be obtained by reference to the accompanying drawings in which:

FIG. 5 is an exploded view of the thruster shown in FIGS. 3 and 4.

FIG. 6 is a sectional view taken on the line VI—VI of FIG. 5.

FIG. 7 is a sectional view taken on the line VII—VII of FIG. 5.

DESCRIPTION OF THE PREFERRED EMBODIMENTS

Figure 1:
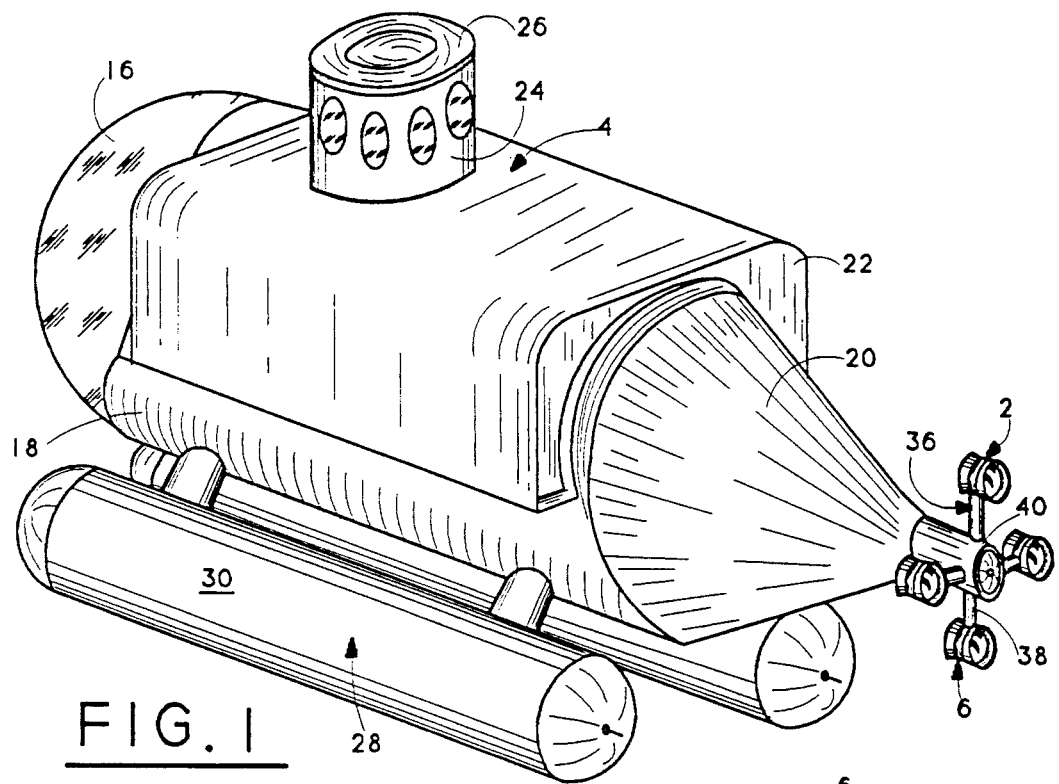
FIG. 1 is an isometric view of a submarine vessel equipped with a propulsion system of the invention.
Figure 2:
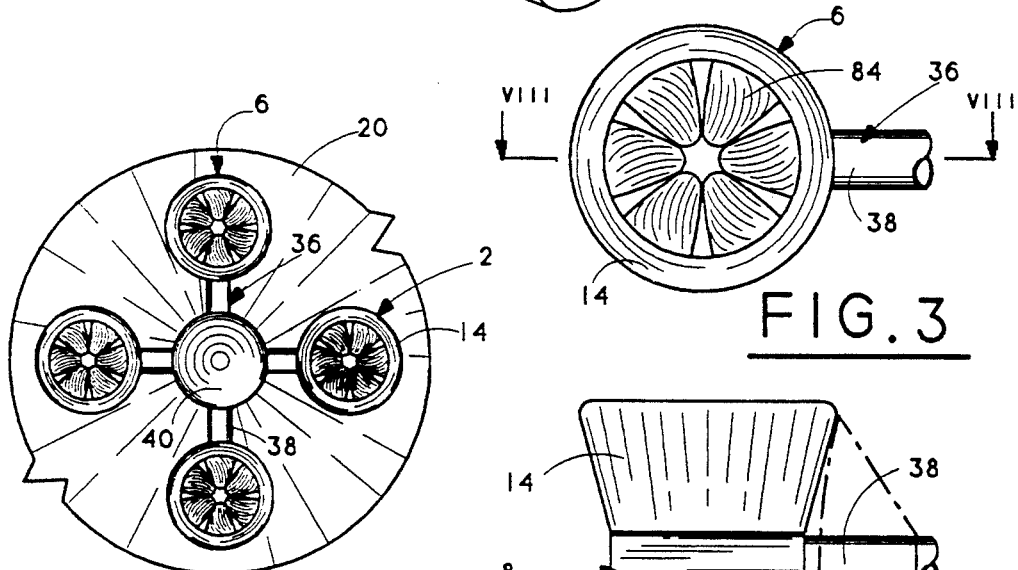
FIG. 2 is a fragmentary view of the stern of the vessel of FIG. 1.
Figure 3:
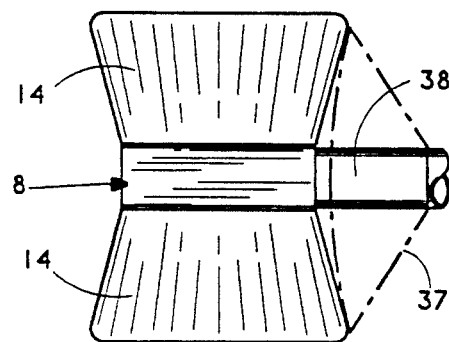
FIG. 3 is an enlarged, fragmentary stern view of one of the thrusters of the propulsion system shown in FIG. 1.

Referring in detail to the drawings, a propulsion system 2 of the invention for a manned submarine vessel 4 comprises a plurality of thrusters 6 each having a magnetic flux generating stator 8, a propellant rotor 10, bearing means 12 and nozzle means 14 held together as a unit by bolts 15.

The vessel includes a bow 16 in the form of a transparent, acrylic hemisphere, a main pressure hull 18, stern 20, ballast tanks 22, a conning tower 24 with hatch 26 and a battery electric supply source 28 in the form of pods 30 containing multiple batteries (not shown).

Additional basic components of the systems 2 include conductor means 32 to supply power and control electrical current to the thrusters 6, controller means 34 to regulate the electrical current and mounting means 36 to attach the thrusters 6 to the vessel 4. Conductor means 32 advantageously comprises a power cable 37P and control cable 37C.

Figure 4:
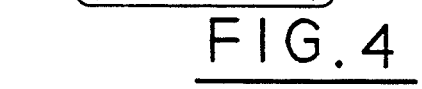
FIG. 4 is a plan view corresponding to stern view of FIG. 3.

The ring-like thrusters 6 are reversible and variable speed, preferably four in number and mounted aft of the stern 20 of the vessel 4 in opposed pairs. They require no rotating seals nor pressure proof housings in contrast to prior known thrusters used with submarine vessels. If desired, fairing 37 (shown in phantom in FIG. 4) may be used to streamline the mounting means 36.

In preferred embodiments, the mounting means 36 comprise tubular shafts 38 rotatably carried on the separate, tubular compartment 40 attached to the aft end of the stern 18 of vessel 4. This enables the thrusters 6 to be rotated about the longitudinal axes of the shafts 38 whereby the thrusters 6 act both as a rudder and as vertical & horizontal thrusters for the vessel 4. Since the compartment 40 does not invade the integrity of the hull 18, its interior can operate at ambient pressure so pressure-proof seals at the junctions of shafts 38 with the compartment 40 are not necessary.

In a convention submersible of the prior art (not shown), the compartment 40 would be the location for a standard propeller shaft and high pressure seals (not shown).

The stator 8 of thruster 6 (see FIG. 8) comprises a pair of spaced apart, ring-like side plates 42 each defined by a first outer circular periphery 44 of diameter D1, an outer face 46, an inner face 48 and a central circular opening 50 through the outer and inner faces defined by a inner circular periphery 52 of diameter D2.

Stator 8 also includes stator (motor) ring 54 of width W1 defined by an outer circular periphery 56 of diameter D3, advantageously equal to D1, an inner circular periphery 58 of diameter D4 larger than D2 and a pair of side edges 60.

The stator ring 54 is positioned between and fixed to the side plates 42 and a plurality of similar pole pieces 62 of width W2 made of magnetizable material are positioned along a circular locus of diameter D5 smaller than D4 but larger than D2. The pole pieces 62 are substantially centered between side edges 60 and each pole piece is associated with windings 64 of a plurality of separate conductive wires 65 each insulated from each other. The pole pieces 62 and windings 64 are potted in plastic 66 forming a ring-like structure 68 inside the stator ring 54. The wires 65 are electrically connected to the conductor means 32 via the controller means 34.

The rotor 10 comprises a propeller ring 70 of width W2 defined by an outer circular periphery 72 of diameter D6, an inner circular periphery 74 of diameter D2 and a pair of side edges 76 having thickness T1 equal to D6 minus D2.

A circular channel 78 in the propeller ring 70 extends through the outer circular periphery 72 to a depth less than T1 and is substantially centered between the side edges 76. A ring 79 of steel or equivalent magnetizable material of thickness T2 is fixed to the bottom of channel 78.

A plurality of permanent magnets 80 of thickness less than T1 minus T2 are fixed in channel 78 in contact with ring 79 by potting plastic 82. The polarity of the magnets 80 alternates along their path and ring 79 acts as a magnetic return path to enhance the magnetic flux effect of the magnets 80.

A plurality of propeller blades 84 are fixed to and depend from the inner circular periphery 74.

The bearing means 12 of the thrusters 6 comprise first semi-circular grooves 86 in the inner faces 48 of the side plates 42 juxtaposed to the inner circular periphery 52 of the stator 6, second semi-circular grooves 88 in the side edges 76 of rotor 10 and a plurality of ball bearings 90 captured between the first and second grooves 86 and 88 respectively.

Instead of ball bearings, roller bearings may be used, in which case grooves 86 will be rectangular, rather than semi-circular in shape. Advantageously, the bearings, which are lubricated by ambient sea water, are made of nylon or equivalent plastic.

In operation of the vessel 4, the propeller ring 70 with its blades 84, held in place within the stator 8 by the bearing means 12, acts as an armature to the magnetic flux generated by the pole pieces 68 under the influence of the windings 64. The electric current passing in the windings 64 is commutated electronically by the controller means 34 in response to sensors (not shown) forming a part of means 34, which sense position and polarity of magnets 80 fixed into the propeller ring 70. Accordingly, the magnets 80 apply torque to the propeller ring 70 and, in turn, to the blades 84. Thrust from the blades 84 is transmitted through bearing means 12 to stator 8 and, in turn, to vessel 4 via the mounting means 36.

Figure 8:
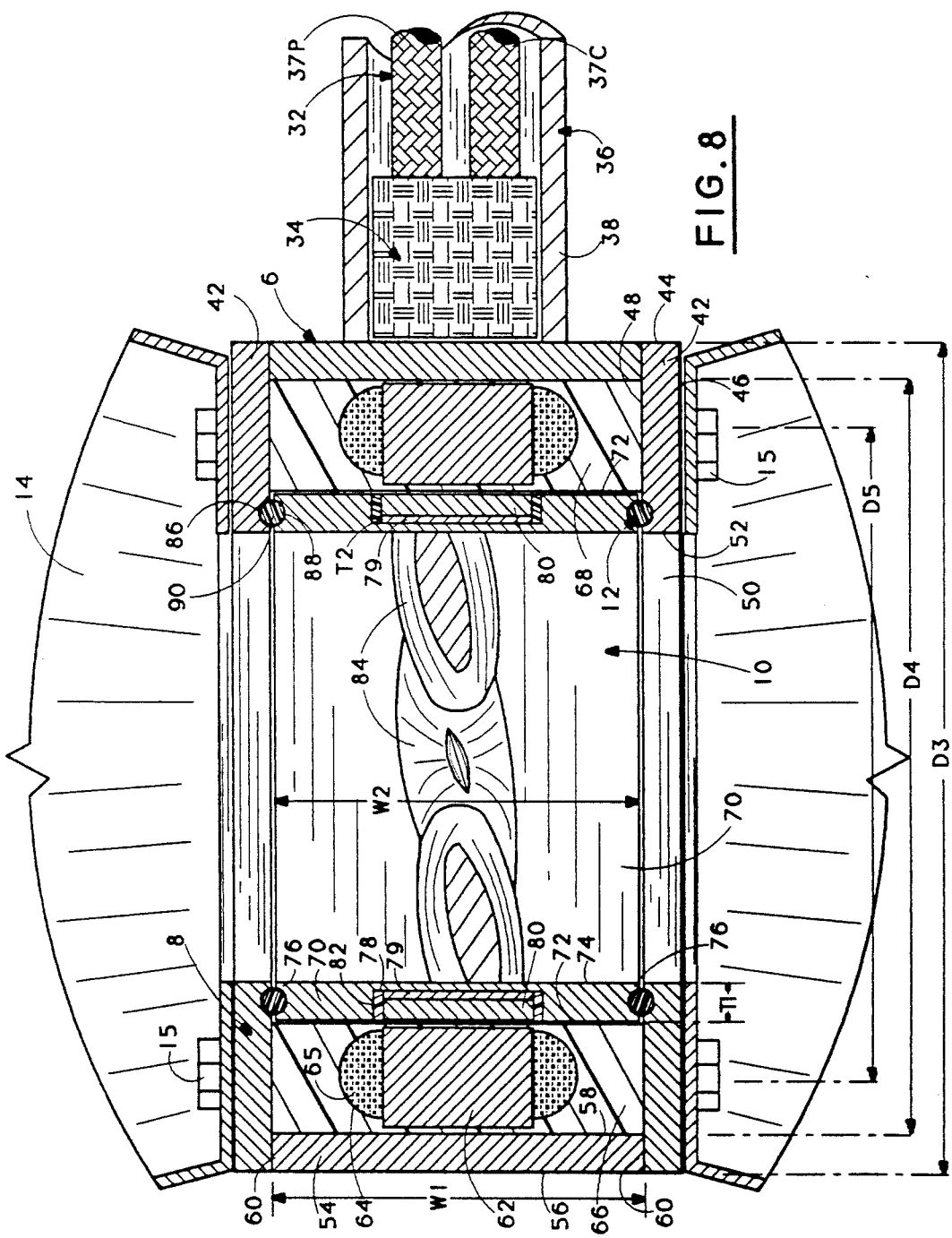
FIG. 8 is a fragmentary, sectional view taken on the line VIII—VIII of FIG. 3.

There are many different ways for electronic commutation of a brushless D.C. motor. A basic design is simply a motor that uses Hall effect sensors to sense rotor position and thus control phase commutation. Arrangements for electronic commutation of brushless electric motors comprising flux generating pole pieces and permanent magnet armatures have been disclosed, such as in U.S. Pat. Nos. 4,900,965 and 5,004,944, the disclosures of which are incorporated herein by reference. The controller means 34 for such commutation can be encapsulated in the thruster 6 (not shown) or remote in a separate space, e.g., part of a tubular mounting means as shown in FIGS. 7 and 8.

The rotation of the rotor 10 (armature) provides position signals to electronic controller means 34 which then energizes the proper field windings to continue the motion. This provides full torque regardless of rotor speed. Since the magnetic force in the pole pieces 26 is turned on and off in direct response to the magnetic field of the armature, the torque remains the same, whether the vessel using the thruster is at rest or under way at full speed. Thus, this type thruster has operating characteristics similar to those of a variable pitch propeller. Control of the propellent rotor thrust is accomplished by controlling the voltage supplied to the windings 64.

In the new propulsion systems of the invention, there are no shaft or like mechanical connections to the propeller ring or blades to cause rotation, thereby reducing vibrations and increasing power efficiency. Also, there is no need for drive shafts, belts, gears or the like so that mounting and power means do not have any influence on each other.

We claim:

1. A propulsion system for a submarine vessel comprising:
   a thruster including a magnetic flux generating stator, a shaftless propellant rotor, bearing means and nozzle means,
   conductor means to supply D.C. electrical current to said thruster from a battery electric supply source,
   controller means to regulate said electrical current and
   mounting means to attach said thruster to said vessel,
   said stator comprising:
      a pair of spaced apart, ring-like side plates each defined by a first outer circular periphery of diameter D1, an outer face, an inner face and a central circular opening through said outer and inner faces defined by a first inner circular periphery of diameter D2 smaller than D1,
      a stator ring of width W1 defined by a second outer circular periphery of diameter D3, a second inner circular periphery of diameter D4 smaller than D3 but larger than D2 and a pair of first side edges, said stator ring being positioned between and fixed to said side plates and,
      a plurality of similar pole pieces of width W2 less than W1 made of magnetizable material positioned along a circular locus of diameter D5 smaller than D4 but larger than D2, said pole pieces being substantially centered between said first side edges,
      each pole piece being associated with windings of a plurality of separate conductive wires each insulated from each other with said pole pieces and windings being potted in plastic forming a ring-like structure inside said stator ring, said wires being electrically connected to said conductor means,
   said rotor comprising:
      a propeller ring of width W2 defined by a third outer circular periphery of diameter D6 smaller than D5, a third inner circular periphery of diameter D2 and a pair of second side edges having thickness T1 equal to D6 minus D2,
      a circular channel in said propeller ring extending through said third outer circular periphery to a depth less than T1, said channel being substantially centered between said second side edges,
      a plurality of permanent magnets of thickness less than T1 positioned in said channel and fixed therein with potting plastic, and
      a plurality of propeller blades fixed to and depending from said third inner circular periphery, and
   said bearing means comprising:
      first semi-circular grooves in said inner face of said side plates juxtaposed to said first inner circular periphery of said stator,
      second semi-circular grooves in said second side edges of said rotor, and
      a plurality of ball bearings captured between said first and second grooves.

2. The propulsion system of claim 1 wherein a steel ring is fixed into the bottom of said circular channel in said propeller ring.

3. The propulsion system of claim 1 wherein D3 equals D1.

4. In a submarine vessel comprising a bow, a stern and a battery electric supply source, the improvement which comprises:

at least one thruster mounted on said stern, said thruster including a magnetic flux generating stator, a shaftless propellant rotor, bearing means and nozzle means, conductor means to supply D.C. electrical current to said thruster from said electric supply source, controller means to regulate said electrical current from said battery electric supply source to said thruster and mounting means to attach said thruster to said stern, said stator comprising:

a pair of spaced apart, ring-like side plates each defined by a first outer circular periphery of diameter D1, an outer face, an inner face and a central circular opening through said outer and inner faces defined by a first inner circular periphery of diameter D2 smaller than D1, a stator ring of width W1 defined by a second outer circular periphery of diameter D3, a second inner circular periphery of diameter D4 smaller than D3 but larger than D2 and a pair of first side edges, said stator ring being positioned between and fixed to said side plates and, a plurality of similar pole pieces of width W2 less than W1 made of magnetizable material positioned along a circular locus of diameter D5 smaller than D4 but larger than D2, said pole pieces being substantially centered between said first side edges, each pole piece being associated with windings of a plurality of separate conductive wires each insulated from each other with said pole pieces and windings being potted in plastic forming a ring-like structure inside said stator ring, said wires being electrically connected to said conductor means, said rotor comprising:

a propeller ring of width W2 defined by a third outer circular periphery of diameter D6 smaller than D5, a third inner circular periphery of diameter D2 and a pair of second side edges having thickness T1 equal to D6 minus D2, a circular channel in said propeller ring extending through said third outer circular periphery to a depth less than T1, said channel being substantially centered between said second side edges, a plurality of permanent magnets of thickness less than T1 positioned in said channel and fixed therein with potting plastic, and a plurality of propeller blades fixed to and depending from siad third inner circular periphery, and said bearing means comprising:

first semi-circular grooves in said inner face of said side plates juxtaposed to said first inner circular periphery of said stator, second semi-circular grooves in said second side edges of said rotor, and a plurality of ball bearings captured between said first and second grooves.

5. The submarine vessel of claim 4 wherein a steel ring is fixed into the bottom of said circular channel in said propeller ring.

6. The submarine vessel of claim 4 that has four of said thrusters mounted on said stern.

7. A propulsion system for a submarine vessel comprising:

a thruster including a magnetic flux generating stator, a shaftless propellant rotor, bearing means and nozzle means, conductor means to supply D.C. electrical current to said thruster from a battery electric supply source, controller means to regulate said electrical current and mounting means to attach said thruster to said vessel, said stator comprising:

a pair of spaced apart, ring-like side plates each defined by a first outer circular periphery of diameter D1, an outer face, an inner face and a central circular opening a stator ring of width W1 defined by a second outer circular periphery of diameter D3, a second inner circular periphery of diameter D4 smaller than D3 but larger than D2 and a pair of first side edges, said stator ring being positioned between and fixed to said side plates and, a plurality of similar pole pieces of width W2 less than W1 made of magnetizable material positioned along a circular locus of diameter D5 smaller than D4 but larger than D2, said pole pieces being substantially centered between said first side edges, each pole piece being associated with windings of a plurality of separate conductive wires each insulated from each other with said pole pieces and windings being potted in plastic forming a ring-like structure inside said stator ring, said wires being electrically connected to said conductor means, said rotor comprising:

a propeller ring of width W2 defined by a third outer circular periphery of diameter D6 smaller than D5, a third inner circular periphery of diameter D2 and a pair of second side edges having thickness T1 equal to D6 minus D2, a circular channel in said propeller ring extending through said third outer circular periphery to a depth less than T1, said channel being substantially centered between said second side edges, a plurality of permanent magnets of thickness less than T1 positioned in said channel and fixed therein with potting plastic, and a plurality of propeller blades fixed to and depending from said third inner circular periphery, and said bearing means comprising:

first grooves in said inner face of said side plates juxtaposed to said first inner circular periphery of said stator, second grooves in said second side edges of said rotor, and a plurality of bearings captured between said first and second grooves.

8. The propulsion system of claim 7 wherein a steel ring is fixed into the bottom of said circular channel in said propeller ring.

9. In a submarine vessel comprising a bow, a stern and a battery electric supply source, the improvement which comprises at least one thruster as defined in claim 7 mounted on said stern.

* * * * *